United States Patent [19]
Hirota et al.

[11] 3,944,650
[45] Mar. 16, 1976

[54] PROCESS FOR REMOVING OXIDES OF SULFUR, DUST AND MIST FROM COMBUSTION WASTE GAS

[75] Inventors: Ryuichi Hirota, Tokyo; Hisashi Kakuta, Yokohama; Shigetado Matoba, Yokohama; Kenichi Shimizu, Yokohama; Ryoichi Kanno, Kanagawa; Mitsuaki Narita, Chigasaki, all of Japan

[73] Assignees: Asahi Glass Company Ltd.; Mitsubishi Kakoki Kaisha Ltd., both of Tokyo, Japan

[22] Filed: Mar. 27, 1973

[21] Appl. No.: 345,341

[30] Foreign Application Priority Data
Mar. 27, 1973 Japan................................. 48-29822

[52] U.S. Cl................................. 423/242; 423/551
[51] Int. Cl.$^2$.......................................... C01B 17/00
[58] Field of Search ........................ 423/242–244, 423/516; 55/527

[56] References Cited
UNITED STATES PATENTS

| | | | |
|---|---|---|---|
| 3,262,180 | 7/1966 | Campbell | 55/527 |
| 3,533,748 | 10/1970 | Zinfer | 423/242 |
| 3,540,190 | 11/1970 | Brink | 55/527 |
| 3,542,511 | 11/1970 | Shah | 423/242 |
| 3,607,001 | 9/1971 | Zinfer et al. | 423/242 |
| 3,632,305 | 1/1972 | Hardison | 423/242 |

*Primary Examiner*—Oscar R. Vertiz
*Assistant Examiner*—Gregory A. Heller
*Attorney, Agent, or Firm*—Oblon, Fisher, Spivak, McClelland & Maier

[57] ABSTRACT

A process is described for the removal of oxides of sulfur, dust and mist from a combustion waste gas such as the waste gas evolved from a glass melting furnace in which the waste gas is contacted with an absorbing solution containing an alkaline absorbent such as NaOH, $Na_2CO_3$ or $Na_2SO_3$, whereby the oxides of sulfur are absorbed and the temperature of the waste gas is decreased and the humidity of the waste gas is increased. The treated waste gas is then passed through a glass fiber filter which is maintained under moist conditions in order to efficiently remove dust and mist particles from the waste gas. Crystalline sodium sulfate hydrate is recovered from the absorbing solution contacted with the waste gas.

3 Claims, 4 Drawing Figures

PROCESS FOR REMOVING OXIDES OF SULFUR, DUST AND MIST FROM COMBUSTION WASTE GAS

BACKGROUND OF THE INVENTION

1. Field of the Invention

This invention relates to a process for removing oxides of sulfur such as $SO_2$ and $SO_3$, dust and mist from the waste gas of a combustion process.

2. Description of the Prior Art

The waste gas evolved from a glass melting furnace, usually contains various oxides of sulfur which are mainly produced by the combustion of fuel oil such as heavy oil containing sulfur, and dust which substantially consists of sodium sulfate ($Na_2SO_4$) vaporized from high temperature molten glass in a glass melting furnace. It has been difficult to remove oxides of sulfur and dust from the waste gases of the characteristic white smoke evolved from stacks in the manufacture of glass. Recently, in order to meet air pollution standards, it has become important for glass manufacturers to remove the smog constituents such as $SO_2$, $SO_3$ and $Na_2SO_4$ from the evolved waste gases.

In the past numerous processes have been proposed for removing or recovering oxides of sulfur from waste gases evolved in the combustion of fuel oil. However, these conventional processes have been difficult to apply for the treatment of waste gases evolved from the glass melting furnaces of glass manufacturing processes.

A need, therefore, exists for a process which effectively removes the oxides of sulfur pollutants and dust particles present in the waste gases evolved in glass manufacturing processes.

SUMMARY OF THE INVENTION

Briefly, it is an object of this invention to provide a process for removing oxides of sulfur such as $SO_2$ and $SO_3$, dust consisting of particles of $Na_2SO_4$, $Na_2SO_3$ and the like and mist from the waste gas evolved from glass melting furnaces.

It is another object of this invention to provide a process for removing and recovering all of the $SO_2$ and $SO_3$ and dust particles consisting of $Na_2SO_4$, $Na_2SO_3$ and the like, and converting them to sodium sulfate which is used as a raw material for the manufacture of glass.

Accordingly, these objects and other objects of this invention as hereinafter will become readily apparent can be attained by contacting the waste gas from the combustion of fuels with an absorbing solution containing sodium hydroxide, sodium carbonate or sodium sulfite as an absorbent whereby the oxides of sulfur in said waste gas are absorbed, a portion of the dust and mist particles are scrubbed from said waste gas and the temperature of said waste gas is decreased as the humidity of the waste gas is increased, and then passing the treated waste gas through a glass fiber filter whereby the dust and the mist remaining in the waste gas are trapped in said filter which is maintained in a moist condition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
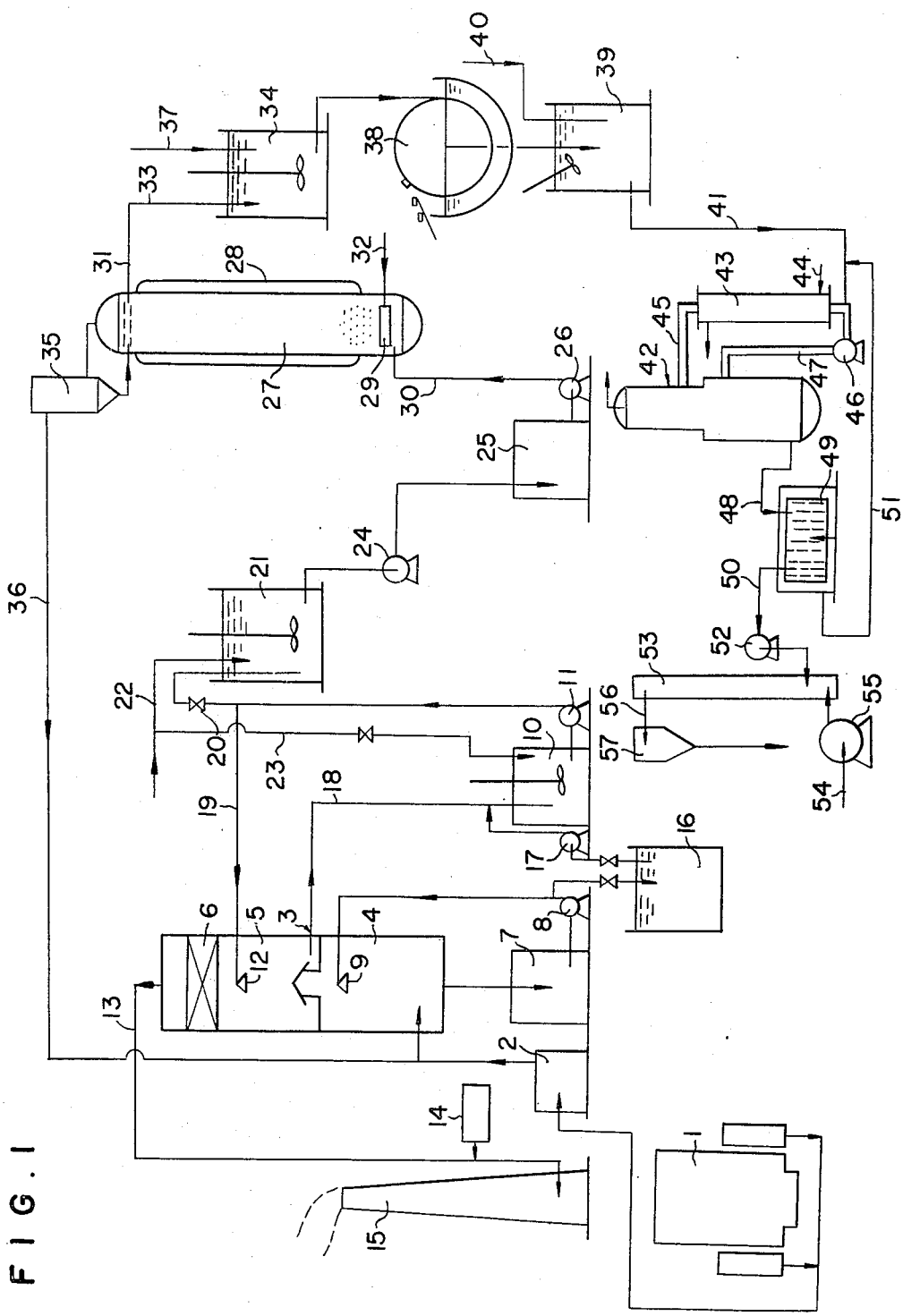
FIG. 1 is a flow-diagram of the preferred embodiment of the process of the invention which shows the prescrubbing and absorbing steps for the removal of oxides of sulfur, dust and mist from the waste gas of a glass melting furnace, and the recovery of sodium sulfate.

In the first step of the process, waste gas is contacted with an alkaline absorbing solution containing sodium hydroxide, sodium carbonate, or sodium sulfite as an absorbent whereby most of the $SO_2$ and $SO_3$ in the waste gas is absorbed in said solution and a portion of the dust and the mist in the gas are scrubbed from the gas. The absorbing solution contacted with the waste gas in this step is removed, the pH of the solution is adjusted and then the absorbing solution is contacted with oxygen or an oxygen containing gas, whereby the sodium sulfite in said solution is oxidized to sodium sulfate and the resulting sodium sulfate is recovered. The temperature of the waste gas issuing from the absorption solution is lowered to 50°–90°C., preferably 60°–80°C while the humidity of the treated gas is increased. The gas containing residual quantities of dust and mist is passed through a glass filter, whereby the moisture in the gas is condensed on the surface of the filter as the temperature decreases resulting in an efficient removal of the dust and mist particles from the gas. It is preferable to maintain the waste gas in a wet condition, whereby the gas contains a small amount of water droplets. The gas is maintained in a saturated or super saturated condition with a relative humidity lower than about 110%. The absorbing solution is usually recycled and the concentration of the absorbent is preferably in the range of 0.1–3% by weight.

Sieve tray towers (perforated plate towers), packed towers, spray towers, and other liquid-gas contacting apparatus can be used as the media by which the absorption and scrubbing of the waste gas is accomplished. Generally, it is preferred to subject the waste gas to a prescrubbing step prior to the absorption step. In the prescrubbing step, an absorbing solution from the absorbing step is contacted with a waste gas issuing from a flue. This step cools the waste gas and a portion of the dust and mist particles and the $SO_2$ and $SO_3$ are removed from said waste gas. Then, the waste gas is sent to the absorption step where it is contacted with the absorbing solution containing NaOH, $Na_2CO_3$ or $Na_2SO_3$, whereby the oxides of sulfur are removed from said waste gas and the temperature and the humidity of the waste gas are adjusted to the desired ranges. The treated waste gas is passed through a filter bed of glass fiber wherein the moisture carried in said waste gas condenses in the filter bed in order that many layers of liquid films are formed throughout the depth of the filter bed. Substantial quantities of dust and mist particles, especially the fine dust particles of sodium sulfate, are collected when the waste gas is repeatedly contacted with the liquid membranes formed in the filter bed. The solution which collects the dust and mist particles gradually flows down the absorption tower and is discharged. Thus, clean waste gas which has been desulfurized and has had dust and mist particles removed, is obtained. The clean waste gas is then heated and passed through a stack to the atmosphere. The dust and mist collected in the filter bed gradually passes through the bed so that pressure loss in the filter bed is relatively small.

The absorption solution which has been used in the absorbing step and the prescrubbing step, contains $Na_2SO_4$, $Na_2SO_3$ and $NaHSO_3$ so that the pH of the solution obtained is slightly acidic. Accordingly, the pH of the solution is adjusted so that the metal salts can be separated in a precipitation vessel, and then the solution can be drained after it is neutralized. However, it is preferable to recover $Na_2SO_4$ which is useful as a raw material for the manufacture of glass and the like. In order to recover $Na_2SO_4$, the absorbing solution is neutralized to a pH of 7-8, and then the solution is contacted with oxygen or an oxygen containing gas to oxidize $Na_2SO_3$ to $Na_2SO_4$ and then $Na_2SO_4$ is recovered. In an embodiment of the process, waste gas containing more than 10% oxygen, preferably more than 12% oxygen, is contacted with the absorbing solution. In the resulting absorbing solution, the oxides of sulfur exist substantially as $Na_2SO_4$. For example, when the oxygen concentration of the waste gas is 8%, 80% of the oxides of sulfur in the absorbing solution exist as $Na_2SO_4$. If the oxygen concentration is greater than 12%, more than 95% of the oxides of sulfur in the absorbing solution exist as $Na_2SO_4$. Thus, in the latter case, $Na_2SO_4$ can be recovered without a separate oxidation step.

In the following detailed description of the preferred embodiment of this invention, reference is continually made to the drawings, especially FIG. 1.

PRESCRUBBING AND ABSORPTION STEPS

In a glass melting furnace 1, the raw materials of sand, sodium carbonate, calcium carbonate, sodium sulfate, and the like used for the manufacture of glass and if necessary, cullet glass are fed into the furnace wherein heavy oil is burned by a burner situated on the wall of the furnace. The surface of the molten glass and the crown is heated by the flame of the burner so that the glass raw materials are melted by the radiant heat and the conductive heat to form the molten glass. Sodium sulfate is added to refine the molten glass so as to remove bubbles in the molten glass. However, some sodium sulfate is easily entrained by the gas flow in the furnace, and some of the $Na_2O$ in the molten glass is vaporized at the high temperatures of the furnace which reacts with $SO_3$ in the waste gas at the low temperature regions of the flue so as to form fine particles of $Na_2SO_4$. The characteristic white smoke from the glass melting furnace is caused by the fine particles of $Na_2SO_4$ present in the combustion waste gas.

Usually, the waste gas contains $SO_2$ and $SO_3$ which is derived from the decomposition of sodium sulfate and the oxidation of sulfur in the heavy oil, $Na_2SO_4$ dust, dust caused by light particles of other materials and soot. The waste gas issuing from the glass melting furnace 1 is passed through a waste heat boiler 2 until it is cooled to about 300°C, and then is fed to a lower portion of an absorption tower 3.

The absorption tower consists of a prescrubbing zone 4 and an absorbing zone 5 in the lower regions of the tower, and a glass fiber demister 6 consisting of a glass fiber filter bed in the upper regions of the tower. An absorbing solution is fed from tank 7 to the upper regions of the prescrubbing zone 4 as a spray 9 by means of pump 8 which recycles the absorbing solution. The waste gas from the waste heat boiler 2 first contacts the sprayed absorbing solution in this region and is scrubbed. As a result, the waste gas is cooled and simultaneously some of the dust and mist in the waste gas is removed.

The absorbing solution contacted with the waste gas is recycled to the tank 7. A portion of the absorbing solution flows from the upper absorbing zone 5 to the prescrubbing zone 4 and is fed to the tank 7. In the absorbing zone 5, the waste gas in contacted with the recycled absorbing solution. The absorbing solution is also fed from tank 10 to spray 12 in absorbing zone 5 by means of pump 11. The absorbing solution is returned to tank 10 after contacting the waste gas and is recycled. Fresh absorbing solution is continuously fed via pipe 23 to the absorbing solution in tank 10 which is recycled to the absorbing zone 5.

In the practice of the prescrubbing and absorbing steps, a simple spray tower can be used, wherein a spray is provided both in the upper regions of the absorbing zone and in the prescrubbing zone. A blank tray is provided in the tower to separate both zones, and the tray is provided with openings which allow free passage of the waste gas up to the absorbing zone and free passage of the absorbing solution down into the prescrubbing zone. However, in actual practice it is preferable to employ a sieve tray tower.

In a preferred embodiment of the invention, a sieve tray tower consisting of an absorbing zone and prescrubbing zone divided by a blank tray of the above-mentioned type is employed. In the sieve tray tower each zone is provided with at least one sieve tray, preferably two to four sieve trays. The sieve trays are provided with a plurality of apertures distributed uniformly across the surfaces of the trays. The apertures range from 5 to 20 mm in diameter. It is possible to modify the absorbing zone of the sieve tray by dividing the absorbing zone into two regions with another blank tray and recycling the absorbing solution discharged from the bottom region of the absorbing zone.

The following equations show the reactions which are believed to occur when the waste gas containing $SO_2$ and $SO_3$ is passed through the absorbing solution and reacts with the absorbent contained therein.

$$2NaOH + SO_2 \rightarrow Na_2SO_3 + H_2O \qquad \text{I}$$

$$4NaOH + 2SO_2 + O_2 \rightarrow 2Na_2SO_4 + 2H_2O \qquad \text{II}$$

$$2NaOH + SO_3 \rightarrow Na_2SO_4 + H_2O \qquad \text{III}$$

$$Na_2SO_3 + SO_2 + H_2O \rightarrow 2NaHSO_3 \qquad \text{IV}$$

$$Na_2CO_3 + SO_2 \rightarrow Na_2SO_3 + CO_2\uparrow \qquad \text{V}$$

$$2Na_2CO_3 + 2SO_2 + O_2 \rightarrow 2Na_2SO_4 + 2CO_2\uparrow \qquad \text{VI}$$

$$Na_2CO_3 + SO_3 \rightarrow Na_2SO_4 + CO_2\uparrow \qquad \text{VII}$$

$$Na_2SO_3 + SO_3 \rightarrow Na_2SO_4 + SO_2\uparrow \qquad \text{VIII}$$

As shown in equation IV, $SO_2$ produced, as shown in equation VIII, is converted to $NaHSO_3$. If the oxygen concentration in the waste gas is high, the reactions shown in equation II or equation VI mainly occur in comparison to the competing reactions shown in equations I and V.

The waste gas usually contains a large amount of $CO_2$, and accordingly, it is necessary to inhibit the formation of $Na_2CO_3$ as far as possible when contacting the waste gas with the absorbing solution. For this purpose, it is preferable to adjust the pH of the absorbing solution, which is recycled to the prescrubbing zone, to 5–7, especially 5.5–6.0. On the other hand, it is preferable to adjust the pH of the absorbing solution removed from the absorbing zone to 6–9, especially 7.0–7.5.

STEPS FOR THE REMOVAL OF DUST AND MIST FROM THE GAS

The desulfurized gas issuing from the scrubbing and absorbing steps, contains $Na_2SO_4$, which is difficult to absorb in the absorbing solution, as well as mist and $SO_3$. Thus, the gas is passed through the glass fiber demister 6. In one embodiment of the structure of the demister, shown in FIG. 3(a), cylindrical glass fiber filters 60 are suspended vertically in the upper regions of the absorbing zone 5. The detail of the glass fiber filter 60 is shown in FIG. 4, and consists of a perforated chemical resistant metal or plastic cylinder 61 having a bottom and a glass fiber layer 62 wrapped around the cylinder. Waste gas that contacts the glass filters diffuses through the glass fiber layer and passes through the perforations in the plastic or metal cylinder into the interior regions of the cylinder. Thereafter, the filtered gas rises through the core of the cylinder.

Figure 3:
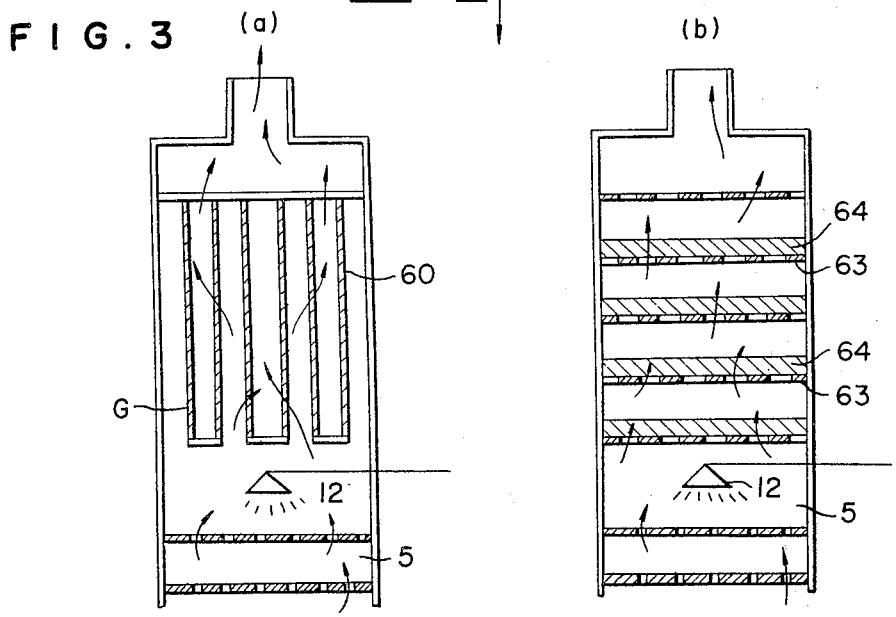
FIGS. 3(a) and 3(b) show two embodiments of the glass fiber demisters in which the demisters are combined with absorption towers as integral units.
Figure 4:
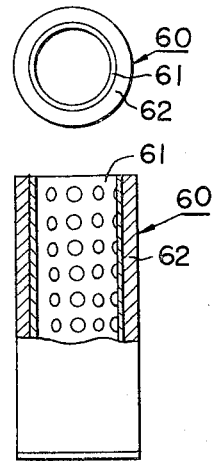
FIG. 4 shows detailed top and side views of one element of the glass fiber demisters.

It is also possible to provide shelves 63 containing apertures or openings horizontally disposed within the upper regions of absorbing zone 5, as shown in FIG. 3(b), wherein each shelf is provided with a glass fiber filter layer 64. It is possible to substitute a filter cloth made of glass fiber for the glass fiber filter layers on the shelves.

In the operation of the glass fiber demister, water, hot water or a solution of $Na_2SO_3$ is preferably fed to the filter layer in order to wash the dust particles therefrom. The operation can be continuous or intermittent, however, pressure losses temporarily occur when the solution is fed to the filter layer. The temporary pressure losses of the apparatus can be prevented by separating the filter layers to be washed into groups and then washing each group of filter layers progressively.

Figure 2:
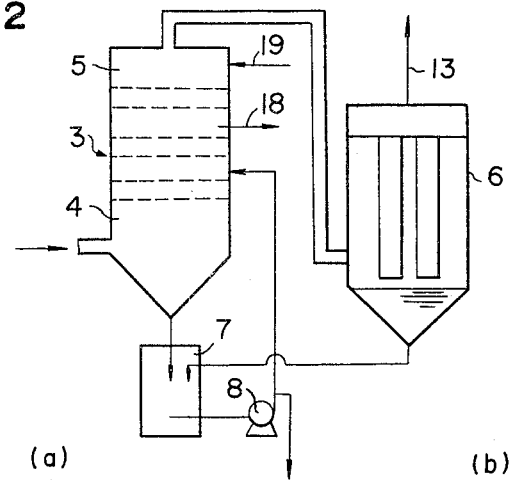
FIG. 2 shows one embodiment of the invention in which a glass fiber demister is used as a separate unit with the absorption tower.

The glass fiber filter is usually made of glass wool, however, rock wool, long glass fiber (filament) or glass fiber cloth can be used. Usually, acid resistant or alkali resistant glass fibers containing an alkaline oxide can be used as the glass fiber for the filter layer. The density of the glass fiber filter is preferably in a range of 150–250 kg/m³ from the viewpoint of pressure loss, and the thickness of the glass fiber filter is preferably in a range of 40–60 mm. The glass fiber demister 6 discussed above, exists as a unit in the upper regions of absorbing tower 3. However, it is possible to use the glass fiber demister 6 as a separate unit from the absorbing tower as shown in FIG. 2. In this case, the solution which discharges from the demister 6 is recycled and fed back to the prescrubbing zone 4 at the base of the absorbing zone.

The desulfurized waste gas, which has passed through the glass fiber beds wherein mist containing $H_2SO_4$, $Na_2SO_4$ dust and other dust particles are removed, is passed to tack 15 through pipe 13. If necessary, low sulfur content fuel oil can be burned by after-burner 14 to heat the waste gas as it exits the stack to the atmosphere. This process effectively accomplishes the stated objective of substantially removing $SO_2$, $SO_3$, dust and mist from the waste gas of the glass melting furnace.

TREATMENT OF THE EXHAUST SOLUTION FROM THE ABSORBING TOWER

It has been shown that the absorbing solution used in prescrubbing zone 4 is recycled by the pump 8. The absorbing solution contains $Na_2SO_4$, and accordingly the solution must be removed after a certain period, and transferred to the sedimentation tank 16. The supernatant liquid is forced from the sediment tank to the absorbing solution tank 10 by pump 17.

It has been also stated that in the absorbing zone 5, the alkaline absorbing solution is recycled by pump 11 to tower 3 in order to remove $SO_2$ and $SO_3$ from the waste gas. Pipe 18 returns the absorbing solution to tank 10, and the absorbing solution is recycled back to tower 3 through pipe 19 to the spray 12 via pump 11. During the recycling operation, the absorbing solution is saturated with $SO_2$, and accordingly, after a specific period a portion of the absorbing solution saturated with $SO_2$ is transferred to the absorbing solution control tank 21 by opening valve 20. A 0.1–3% by weight sodium hydroxide solution is added through pipe 22 to control tank 21 in order to neutralize the absorbing solution to a pH of 7–8. Pipe 22 is branched to form pipe 23 so that the neutralizing solution, as a fresh supply of absorbent, can be fed to the absorbing solution tank 10. When suitable quantities of sodium hydroxide are added to the absorbing solution control tank 21 through pipe 22, and when the solution is sufficiently stirred, $NaHSO_3$ in the absorbing solution is converted to $Na_2SO_3$.

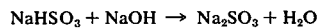

$$NaHSO_3 + NaOH \rightarrow Na_2SO_3 + H_2O$$

The pH adjusted solution in the absorbing solution control tank 21 is then fed to tank 25 by pump 24, which in turn is fed to the bottom of oxidation tower 27 by pump 26.

As stated above, if the recovery of sodium sulfate is not required, the absorbing solution discharged from the prescrubbing zone 4 and the absorbing solution discharged from the absorbing zone 3 are recycled and heavy metal compounds are removed and the solution is neutralized before draining it. On the other hand, if sodium sulfate is directly recovered from the absorbing solution discharged from the absorbing tower 3, the oxygen concentration (partial pressure) in the waste gas fed into absorbing tower 3, is maintained in quantities greater than 10% by volume. In this case, the $SO_2$ in the absorbing solution discharged from prescrubbing zone 4 and absorbing zone 5 of absorbing tower 3, is substantially oxidized to $Na_2SO_4$. Accordingly, the absorbing solution can be directly fed to the below mentioned purification and crystallization steps.

OXIDATION STEP

Oxidation tower 27 has a high cylindrical body and is equipped with a water cooling jacket 28 around the outer periphery of the tower body to control the temperature of the solution inside. The tower is also equipped with an atomizer 29 for dispersing fine bubbles of oxygen or an oxygen containing gas (e.g. air)

into the solution at the bottom of the interior regions of the tank. The tower is also equipped with inlet line 30 wherein the solution to be oxidized is fed into the base of the tower, and outlet line 31 wherein the oxidized solution is removed from the upper region of the tower. When the oxidation tower 27 is filled with the solution to be oxidized, oxygen or an oxygen containing gas is injected through the gas inlet 32 and through atomizer 29 at the base of the tower to form fine bubbles, whereby $Na_2SO_3$ in the solution is oxidized to $Na_2SO_4$. The oxygenated solution is gradually removed from the upper outlet 31 and is then fed to a purification process.

Since the reaction in the oxidation tower is an oxidizing reaction, the temperature inside the tower increases because of the exothermic reaction. The temperature of the tower can be controlled by admitting cooling water to the jacket 28. The temperature of the solution is preferably maintained in the range of about 80°–100°C. In the reaction, the rate of oxidation can be promoted by the addition of a metal, non-metallic element or metal salt derived from elements such as Fe, Ni, Co, Cu, S, Se, Te, and the like as a catalyst. It has been found that conversions of substantially 100% can be achieved without the addition of a catalyst. The solution removed from outlet 31 passes through pipe 33 to purification tank 34. A gas consisting of a vapor from the heating process, excess air and $SO_2$ generated by partial decomposition of the sulfur containing compounds in solution, is exhausted from the oxidation tower. Accordingly, the gas must be passed through an entrained mist separator 35 to remove the entrained mist. The gas from the separation can then be recycled to the oxidation tower 27 or recycled to the absorbing tower 3 through pipe 36.

PURIFICATION STEP

In purification tank 34, when a solution of sodium hydroxide is added through pipe 37 to adjust the pH of the solution fed from the oxidation tower to 10–11, metal salt impurities of metals such as Fe, Ni, Cr, and the like are precipitated as the hydroxides thereof. The solution containing the precipitated material is fed to the filter 38 to separate the filtrate and the precipitate. The precipitate can be dried and useful metal can be recovered, if necessary. The filtrate is fed to tank 39 where sulfuric acid is added through pipe 40 to neutralize the solution to a pH of about 7. $Na_2SO_4$ is formed in solution in the process. The solution is then fed through pipe 41 to crystallization apparatus 42.

CRYSTALLIZATION STEP

The solution fed from tank 39 through pipe 41 passes through heater 43, wherein the solution is heated by steam 44 which is injected into the jacket of the heater. The concentrated solution is then fed through pipe 45 to crystallization tank 42. The upper portion of crystallization tank 42 is connected to a vacuum apparatus wherein the solution is vaporized under a reduced pressure which simultaneously concentrates and cools the solution.

During the period in which the solution is recycled through crystallization tank 42, pipe 47, heater 43 and pipe 45 via pump 46, crystalline sodium sulfate hydrate ($Na_2SO_4$) precipitates at the bottom of the crystallization tank 42. The slurry of the precipitated crystals is transferred through pipe 48 by the dehydrating machine 49 in order to dehydrate the crystals. The dehydrating machine 49 can be a centrifugal type separator. The crystals are dehydrated to a moisture content of 2–3% by weight by the dehydrating machine, and then are fed through pipe 50 to the drying step. At the same time, the mother liquid is recycled through pipe 51 to pipe 41.

DRYING STEP

The crystalline sodium sulfate hydrate containing 2–3% by weight moisture, is passed through pipe 50 to crusher 52 and subsequently to the bottom of the air drying cylinder 53. At the same time, hot air is fed through pipe 54 to the bottom of the air drying cylinder 53 by fan 55, whereby the crystals are heated by the hot air. The dried crystals are fed through pipe 56 in the upper region of cylinder 53 to cyclon 57 where the crystals are collected. The collected crystalline sodium sulfate hydrate can be recycled to the glass melting tank, if necessary after sieving.

Having generally described this invention, a further understanding can be obtained by reference to a specific example which is provided herein for purpose of illustration only and is not intended to be limiting unless otherwise specified.

The composition of a waste gas and its temperature and flow rate exiting from the flue of a glass melting furnace is as follows:

Flow rate — 500 Nm³/hr.
Temperature — 300°C

| Composition | Vol. % |
|---|---|
| $O_2$ | 7.36 |
| $H_2O$ | 8.00 |
| $CO_2$ | 9.20 |
| $SO_2$ | 0.10 |
| $SO_3$ | 0.01 |
| dust | 130 mg/Nm³ |

(90 wt. % of dust is $Na_2SO_4$)

The waste gas was fed to the prescrubbing zone of an absorption tower equipped with sieve trays and a prescrubbing zone in its lower regions. The absorbing zone was in the upper regions of the tower.

A 2 wt.% solution of NaOH and the absorbing solution discharged from the base of the absorbing zone are recycled and fed into the upper portion of the absorbing zone of the absorption tower. Operating conditions were controlled so that the absorbing solution discharged from the absorbing zone had a pH of 7–7.5 and the absorbing solution discharged from the prescrubbing zone had a pH of 5.5–6.0.

The composition of the absorbing solution fed to the upper portion of the absorbing zone is approximately as follows:

| | |
|---|---|
| NaOH | 1.0 wt.% |
| $Na_2CO_3$ | 1.7 wt.% |
| $Na_2SO_4$ | 1.6 wt.% |
| pH | 9 – 10 |

The composition of the absorbing solution discharged from the bottom of the absorbing zone is approximately as follows:

| | |
|---|---|
| $Na_2SO_4$ | 1.9 wt.% |
| $NaHSO_3$ | 0.16 wt.% |

The composition of the absorbing solution discharged from the bottom of the prescrubbing zone is approximately as follows:

| | |
|---|---|
| $Na_2SO_4$ | 13 wt.% |
| $Na_2SO_3$ | 0.1 wt.% |
| $NaHSO_3$ | 1.7 wt.% |

The solids content of the absorbing solution which was discharged from the absorption tower and which was fed to the absorbing solution control tank, was about 15 wt.%. The solid residue consisted of 90 wt.% $Na_2SO_4$ and 10 wt.% of a mixture of $Na_2SO_3$ and $NaHSO_3$.

The composition of the waste gas exhausted from the absorption tower was as follows:

| Temperature — 60°C | |
|---|---|
| $SO_2$ | 15 ppm |
| $SO_3$ | 25 ppm |
| $H_2O$ | 17 vol.% |
| dust | 60 mg/Nm³ |

The treated waste gas was fed to a glass fiber demister consisting of a plurality of cylindrical glass fiber filter beds, wherein the gas was freed of dust and mist.

The composition of the waste gas passed through the glass fiber demister was as follows:

| Temperature — 55°C | |
|---|---|
| $SO_2$ | 12 ppm |
| $SO_3$ | 8 ppm |
| $H_2O$ | 16 vol.% |
| dust | 3 mg/Nm³ |

The waste gas was heated by the after-burner and was passed out of the stack. No white smoke was observed. The absorbing solution which passed from the absorption tower, was treated by adding NaOH to the absorbing solution control tank to adjust the pH to 7–8. This solution was fed to the oxidation tower wherein the solution was oxidized with air, and then it was fed to the purification zone, wherein the solution was treated by adding NaOH to adjust the pH to 10–11. Heavy metal compounds precipitated in this step and they were removed. The solution was neutralized, and crystalline sodium sulfate hydrate was precipitated in the crystallization step and then dried before recovery. The average diameter of the resulting crystalline sodium sulfate hydrate was 300μ so that it was suitable for use as a raw material for the manufacture of glass.

In accordance with the process of this invention, the following characteristic advantages were found.

1. It is possible to completely remove the white smoke caused by the presence of $SO_2$, $SO_3$ mist, dust and $Na_2SO_4$ from the waste gas formed by the combustion of heavy oil in a combustion furnace such as a glass melting furnace.

2. It is possible to recover all of the $Na_2SO_4$, $SO_2$, and $SO_3$ present in the waste gas from a glass melting furnace, and also to recover $Na_2SO_4$ formed by oxidation of the sulfur containing components with excess air in the absorption tower. No loss of $Na_2SO_4$ is encountered because the recovered sodium sulfate hydrate can be used in the glass melting furnace.

3. It is possible to remove all of the impurities by this process, so that atmospheric pollution can be minimized, and also pollution of waste water can be prevented.

4. The glass fiber demister can be used for a long period, and moreover, it can be used as a raw material for the manufacture of glass in the glass melting furnace by washing it after its useful life is terminated.

5. It is possible to completely remove Fe, Al, Ni and Cr impurities from the absorbing solution, so that the sodium sulfate hydrate, which is useful as a pure raw material for the manufacture of glass, can be obtained.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A process for removing oxides of sulfur, sodium sulfite, sodium sulfate, dust and mist from combustion waste gas evolved from a glass melting furnace which comprises the steps of:

pre-scrubbing said combustion waste gas with an absorbing solution discharged from an absorption zone, whereby chiefly dust and mist particles are removed from said waste gas;

contacting said pre-scrubbed waste gas with an absorbing solution continuously supplied with at least one alkali absorbent selected from the group consisting of sodium hydroxide, sodium carbonate and sodium sulfite such that the concentration of absorbent in said solution is 0.1–3 weight % which solution cools said waste gas to a temperature of 50°–90°C and humidifies said waste gas by at least saturating said gas with moisture;

adjusting the pH of said absorbing solution discharged from said pre-scrubbing zone and the pH of said absorbing solution discharged from said contacting step to 5–7 and 6–9 respectively in order to prevent the formation of sodium carbonate; and passing said contacted waste gas through a glass fiber filter of a density of 150–250 kg/m³ which is maintained in a moistened condition to promote the effective filtration of dust and mist from said contacted waste gas.

2. The process according to claim 1, wherein said waste gas is contacted with said absorbing solution under conditions in which said waste gas contains more than 10% oxygen by volume, whereby the oxides of sulfur present in said waste gas are absorbed as sodium sulfate and the resulting sodium sulfate is recovered.

3. A process for removing oxides of sulfur, sodium sulfite, sodium sulfate, dust and mist from combustion waste gas evolved from a glass melting furnace which comprises the steps of:

pre-scrubbing said combustion waste gas with an absorbing solution discharged from an absorption zone, whereby chiefly dust and mist particles are removed from said waste gas;

contacting said pre-scrubbed waste gas with an absorbing solution continuously supplied with at least one alkali absorbent selected from the group consisting of sodium hydroxide, sodium carbonate and sodium sulfite such that the concentration of absorbent in said solution is 0.1–3 weight % which solution cools said waste gas to a temperature of 50°–90°C and humidifies said waste gas by at least saturating said gas with moisture;

adjusting the pH of said absorbing solution discharged from said pre-scrubbing zone and the pH of said absorbing solution discharged from said contacting step to 5–7 and 6–9, respectively, in order to prevent the formation of sodium carbonate;

passing said contacted waste gas through a glass fiber filter of a density of 150–250 kg/m$^3$ which is maintained in a moistened condition to promote the effective filtration of dust and mist from said contacted waste gas;

oxidizing said pH adjusted absorbing solution discharged from said pre-scrubbing zone and said pH adjusted absorbing solution discharged from said contacting step with oxygen or an oxygen-containing gas whereby sodium sulfite in said pH adjusted absorbing solutions is converted to sodium sulfate;

purifying the oxidized absorbing solutions by adding a solution of sodium hydroxide thereby precipitating from said oxidized absorbing solution hydroxides of metal salts contained therein;

neutralizing the oxidized absorbing solution having hydroxides of metal salts precipitated therefrom thereby precipitating crystalline sodium sulfate; and recovering said precipitated crystalline sodium sulfate.

* * * * *